US012731848B2

(12) United States Patent
Landwehr et al.

(10) Patent No.: US 12,731,848 B2
(45) Date of Patent: Sep. 8, 2026

(54) BATTERY HOUSING

(71) Applicant: Caterpillar Inc., Peoria, IL (US)

(72) Inventors: Dustin Irvin Landwehr, Kewanee, IL (US); David Yokell, Irving, TX (US); Brian Cole, Dunlap, IL (US); Bhavin Nareshkumar Mehta, Bangalore (IN); Richu Gheevarghese Samuel, Kerala (IN); Narayanaswamy Kudithipati, Bangalore (IN); Tyler Mullen, Metamoia, IL (US)

(73) Assignee: Caterpillar Inc., Peoria, IL (US)

(*) Notice: Subject to any disclaimer, the term of this patent is extended or adjusted under 35 U.S.C. 154(b) by 589 days.

(21) Appl. No.: 18/312,222

(22) Filed: May 4, 2023

(65) Prior Publication Data

US 2024/0372202 A1 Nov. 7, 2024

(51) Int. Cl.
*H01M 50/258* (2021.01)
*H01M 10/613* (2014.01)
*H01M 10/6568* (2014.01)

(52) U.S. Cl.
CPC ....... *H01M 50/258* (2021.01); *H01M 10/613* (2015.04); *H01M 10/6568* (2015.04)

(58) Field of Classification Search
None
See application file for complete search history.

(56) References Cited

U.S. PATENT DOCUMENTS 6,462,949 B1 10/2002 Parish et al.
7,324,336 B2 1/2008 Vos et al.
8,399,118 B2 3/2013 Gadawski
8,418,478 B2 4/2013 Parish et al.
10,797,279 B2 10/2020 Tanner et al.
2006/0024566 A1* 2/2006 Plummer ............ H01M 50/204 180/68.5
2016/0211559 A1* 7/2016 Frohnmayer ..... H01M 10/6556
2018/0048039 A1* 2/2018 Newman ............. H01M 10/625
2018/0138466 A1 5/2018 Fees et al.
2019/0143836 A1* 5/2019 Burrows ................. B60L 58/26 429/120
2023/0006300 A1* 1/2023 Schönberger ....... H01M 50/249

FOREIGN PATENT DOCUMENTS

DE 102017119465 A1 * 2/2019 .......... H01M 50/262

* cited by examiner

*Primary Examiner* — Carlos Barcena

(57) ABSTRACT

A battery module housing includes a bottom wall and a pair of sidewalls. At least one of the bottom wall, and the pair of sidewalls is a wall comprising a plurality of fluid channels extending an entire length of the wall, each of the plurality of fluid channels ending in a fluid-routing mechanism formed by an endplate that fluidly couples a first channel of the plurality of fluid channels to a second channel of the plurality of fluid channels via a coolant channel connection formed at a first end of the wall.

20 Claims, 5 Drawing Sheets

BATTERY HOUSING

TECHNICAL FIELD

The present disclosure relates generally to battery housings, and more particularly, to battery housings for modular batteries having one or more walls with internal cooling channels.

BACKGROUND

Standard cooling systems for cooling modular batteries may utilize bottom cell cooling and/or low cost stampings. The effectiveness of these approaches may become increasingly limited as taller, larger cells and/or stacks of cells or stacks of modules are used. That is, cell and module geometry may be such that conduction of heat to the bottom cooling plate or other cooling surfaces is insufficient or impossible. Additionally, stamped cooling plates may provide insufficient sealing and structural support to a module's housing.

U.S. Pat. No. 8,418,478 to Parish et al. ("the '478 Patent"), describes a cooling apparatus using "low profile extrusions." The low profile extrusions described in the '478 Patent may be used to cool printed circuit boards (PCB) of electronic components. The extrusions are used as heat exchangers in applications where space is limited and/or low weight is critical. However, the '478 Patent does not involve, among other things, cooling channels in an extruded wall for housing multiple battery cells.

The battery housing of the present disclosure may solve one or more of the problems set forth above and/or other problems in the art. The scope of the current disclosure, however, is defined by the attached claims, and not by the ability to solve any specific problem.

SUMMARY

In one aspect, a battery module housing includes a bottom wall; and a pair of sidewalls. At least one of the bottom wall, and the pair of sidewalls is a wall comprising a plurality of fluid channels extending an entire length of the wall, each of the plurality of fluid channels ending in a fluid-routing mechanism formed by an endplate that fluidly couples a first channel of the plurality of fluid channels to a second channel of the plurality of fluid channels via a coolant channel connection formed at a first end of the wall.

In another aspect, a battery module housing for housing battery cell cavities includes a first L-shaped extruded part comprising a vertical portion and a horizontal portion; a T-shaped extruded part comprising a vertical portion and two horizontal portions; and a second L-shaped extruded part comprising a vertical portion and a horizontal portion. The vertical portions of the extruded parts form sidewalls of the battery cell cavities, and the horizontal portions of the extruded parts form bottom walls of the battery cell cavities, and the vertical portions of the first L-shaped extruded part, the second L-shaped extruded part, and the T-shaped extruded part include a first fluid channel fluidly coupled to a second fluid channel by a fluid-routing mechanism.

In yet another aspect, a battery housing cell cavity includes a first sidewall; a second sidewall; and a bottom wall. One or more of the first sidewall, the second sidewall, and the bottom wall is an extruded wall comprising a plurality of fluid channels therein.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
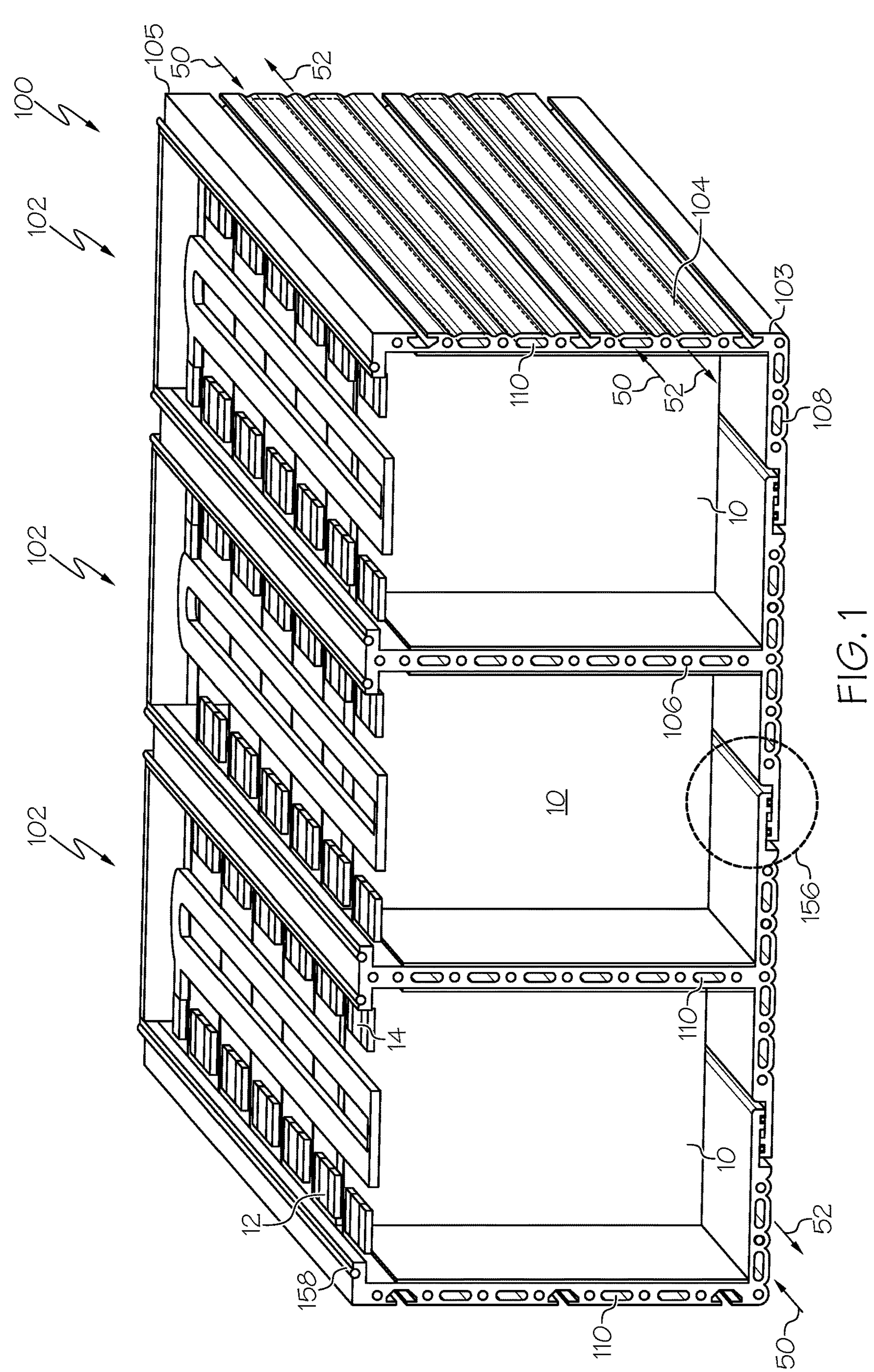
FIG. 1 is an illustration of a battery module including an extruded wall, according to aspects of the disclosure.

FIG. 1 illustrates a battery module housing 100 for housing multiple battery cells 10. The depicted example of battery module housing 100 includes three cell cavities 102, but battery module housings having more or fewer cell cavities are contemplated. Each cell 10 includes a positive terminal 12 and a negative terminal 14. The terminals may be connected in series or in parallel to form a battery (connections not depicted for simplicity). In some embodiments, the individual cells 10 are in physical and thermal contact with an intercell pad 16. In some embodiments, the intercell pad 16 may incorporate passive cooling characteristics via a thermally conductive material that may direct heat to a bottom or a side of the cells 10. In some embodiments, the intercell pad 16 may incorporate a phase change material to increase heat transfer from the cells.

Still referring to FIG. 1, each cell cavity 102 is formed by a first sidewall 104, a second sidewall 106, and a bottom wall 108. One or more portions of the various cell cavity walls or the entire wall may be formed using an extrusion process as explained in greater detail herein. The extruded sidewalls may be made of, for example, aluminum, steel, or iron and may generally extend between a first end 103 and a second end 105. In some embodiments, one or more of the walls include one or more fins for increasing a rate of heat transfer from the battery cells to the environment by increasing convective cooling. In some embodiments, a module lid (not shown) may cover one or more of the individual cell cavities 102 and form a closed cavity, which may be sealed, for example, with a sealing element 158 between the walls and the lid. In some aspects, the sealing element 158 may be formed by generally U-shaped portions of the walls and may extend along one or more dimensions (e.g., a length dimension) of the cell cavity 102 to seal the cell cavity 102 and enclose one or more battery cells 10. The sealing element 158 may generally seal the one or more battery cells 10 from external impurities (e.g., dust, dirt, etc.) from entering the cell cavities 102. In some embodiments, the one or more fins may be thermally coupled to the module lid.

The extrusion process may generally include forcing a metal or other material to flow through a die to convert the metal or other material into a desired shape (e.g., the shape of the extruded sidewalls described herein) using a force applied by a piston and/or a plunger. An ingot or billet of standard or non-standard dimensions and given material may be heated and placed in an extrusion press. The piston or plunger may then force the heated ingot through the die, forming the desired cross section. Thus, the force used in the extrusion process is compressive in nature and may allow large deformation as compared with a drawing process or other tensile forming process. The extruded part may be heat treated or otherwise treated to achieve desired properties after it is pressed. By forming battery module housings using the extruded sidewalls described herein, the present disclosure provides battery modules at relatively low cost and with high levels of standardization and repeatability, which battery module housings are useful in forming large battery packs having any given number of battery cells to power large machinery (e.g., heavy machine equipment).

The walls 104, 106, and/or 108 may also have a plurality of coolant channels 110 extending therethrough along an entire length or a portion of a length of the extruded wall. In some embodiments, the coolant channels 110 may be formed by a portion of the extruded wall that was milled out between adjacent fluid channels, such that adjacent fluid channels are fluidly coupled to one another. That is, a coolant channel connection 148 (FIG. 4) may be formed by milling from the first end 103 and/or the second end 105 of the extruded wall to remove a portion of the extruded wall and fluidly connect adjacent ones of the plurality of coolant channels 110. Accordingly, a coolant channel path between adjacent coolant channels 110 may be formed in the extruded wall. A cooling fluid (e.g., fifty percent water, fifty percent glycol fluid) may flow through the coolant channel path. In some embodiments, the cooling fluid may be air or other gaseous fluid. In some embodiments, the coolant channel path may flow through each of the coolant channels in an extruded wall or through only some of the coolant channels in the extruded wall.

Figure 2:
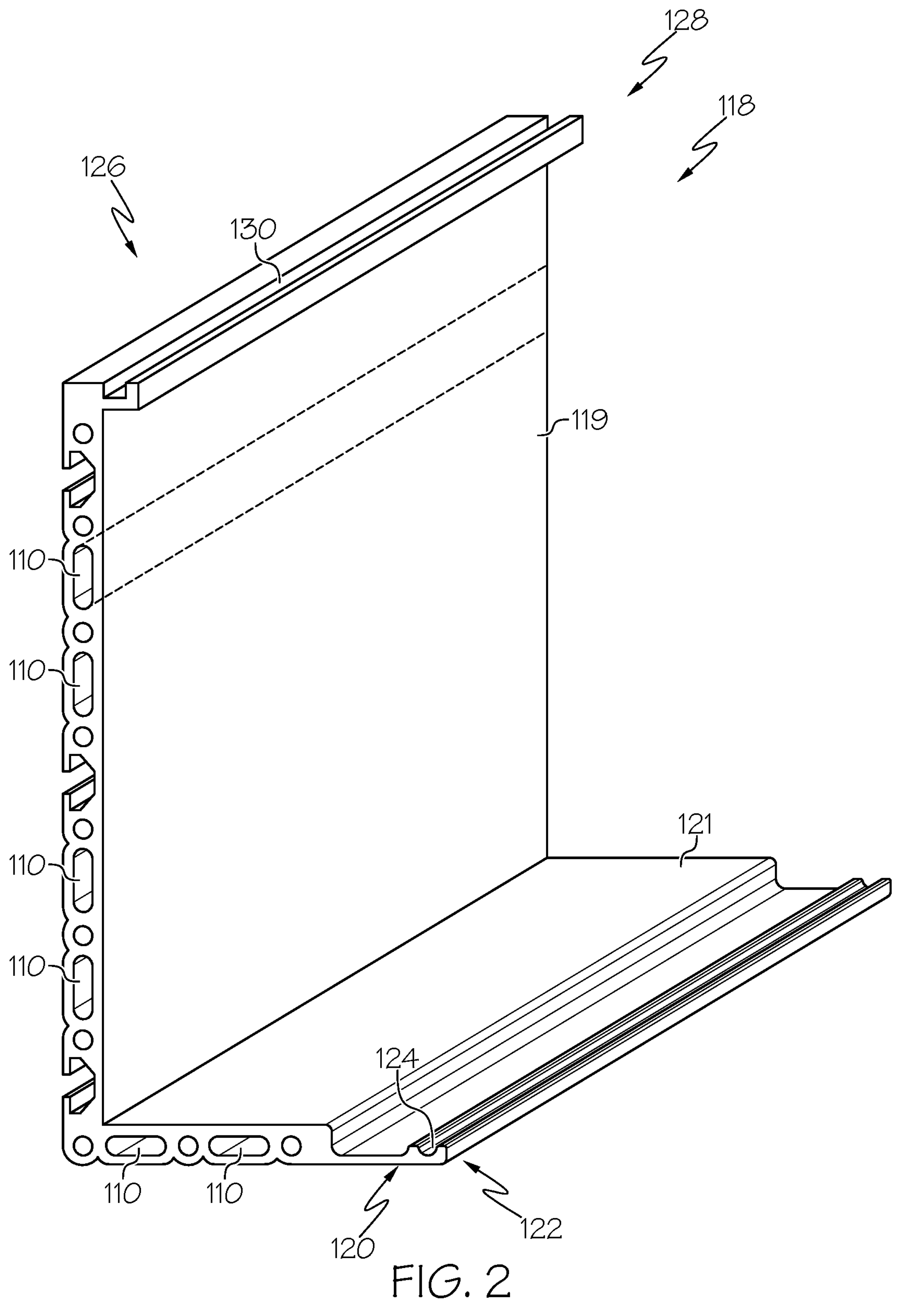
FIG. 2 shows a portion of the battery module of FIG. 1 having an L-shaped wall.

FIG. 2 shows portions of the battery module housing 100 of FIG. 1 in greater detail. FIG. 2 shows an L-shaped extruded part 118 that includes multiple coolant channels 110 formed in a vertical portion 119 and in a horizontal portion 121, a bottom wall connection interface 120, and a top connection interface 126. In the particular embodiment shown, the coolant channels 110 pass through an entire length of the part 118 as indicated by the dashed lines shown, but that is not necessarily the case, especially in embodiments in which two adjacent cooling channels are connected (as described herein, especially with respect to FIG. 4). The bottom wall connection interface 120 includes a sealing component 122 that includes a sealing channel 124 for receiving a sealing element (not shown), which may be similar or equivalent to the sealing element 158 of FIG. 1. The sealing element may be, for example, a rubberized gasket, liquid sealant (e.g., room temperature vulcanized silicone, paper gasket, etc.), or other seal placed in the sealing channel 124. The top connection interface 126 may include a sealing component 128 and a sealing channel 130, which sealing channel may be configured to receive a sealing element (not shown).

Figure 3:
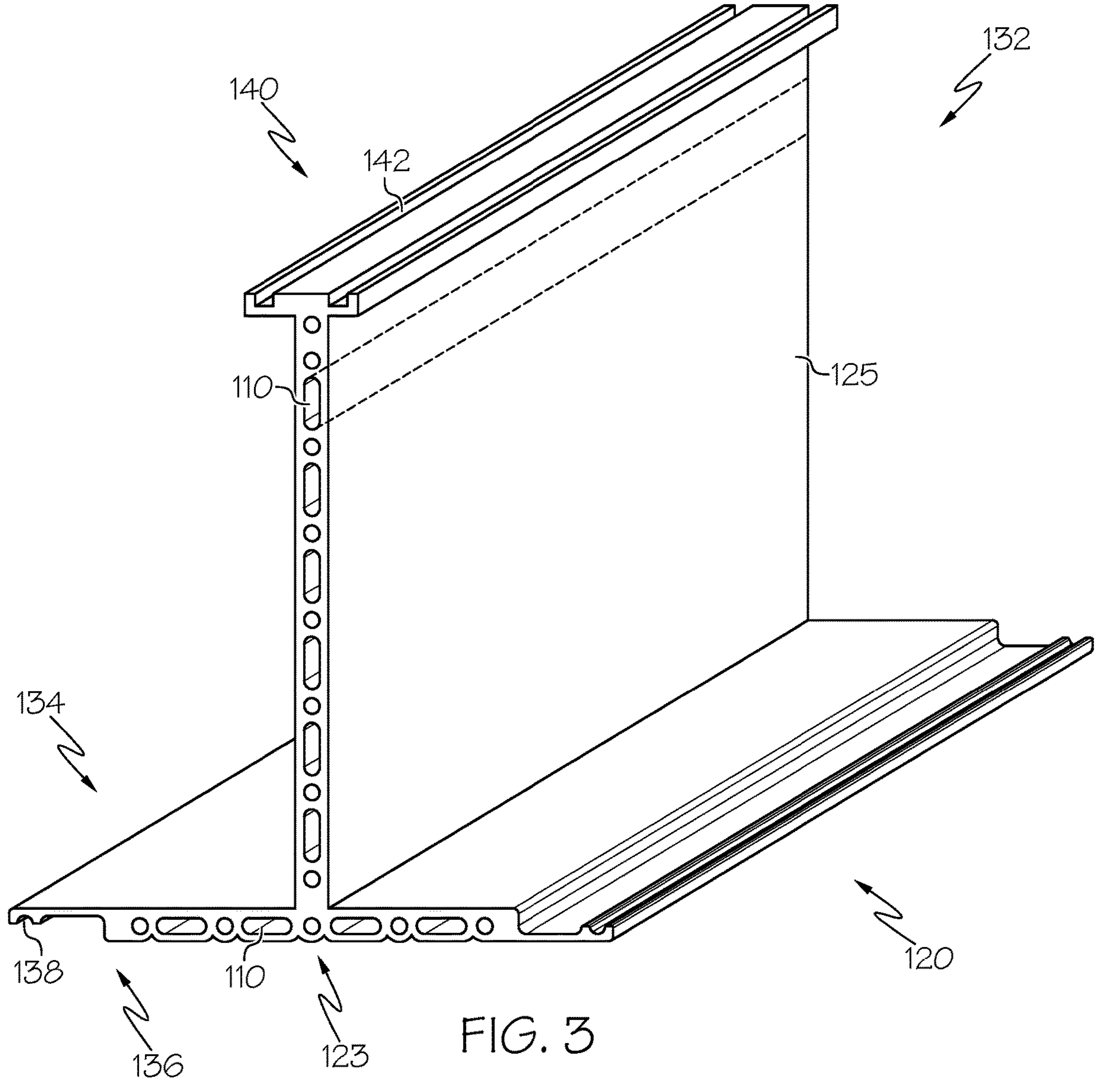
FIG. 3 shows a portion of the battery module of FIG. 1 having a T-shaped wall.

FIG. 3 shows further portions of the battery module housing 100 of FIG. 1 in greater detail. FIG. 3 shows a T-shaped extruded part 132 having additional coolant channels 110 passing through an entire length of the part. The T-shaped extruded part 132 includes a vertical portion 125 and a horizontal portion 123 extending in opposite direction from the vertical portion 125. The vertical portion 125 may include a top sealing interface 140 including a pair of scaling channels 142. The horizontal portion 123 may include a bottom wall connection interface 120 similar to the bottom wall connection interface 120 of FIG. 2 and a second bottom wall connection interface 134, which may mirror the bottom wall connection interface 120 of FIG. 2 such that the two interfaces can be combined to seal a bottom wall 108 of an individual cell cavity 102. The second bottom wall connection interface 134 may include a connector 136 including a sealing channel 138.

Briefly referring to FIGS. 1, 2, and 3, the bottom wall 108 of an individual cell cavity 102 may be formed by overlapping a bottom wall connection interface 120 with a second bottom wall connection interface 134 to form an overlapping portion. This overlapping portion may form a junction 156 that is sealed with sealing elements 158 passing through the sealing channels 124, 138 to seal the overlapping portion. In some aspects, the sealing element forms an air tight seal.

Figure 4:
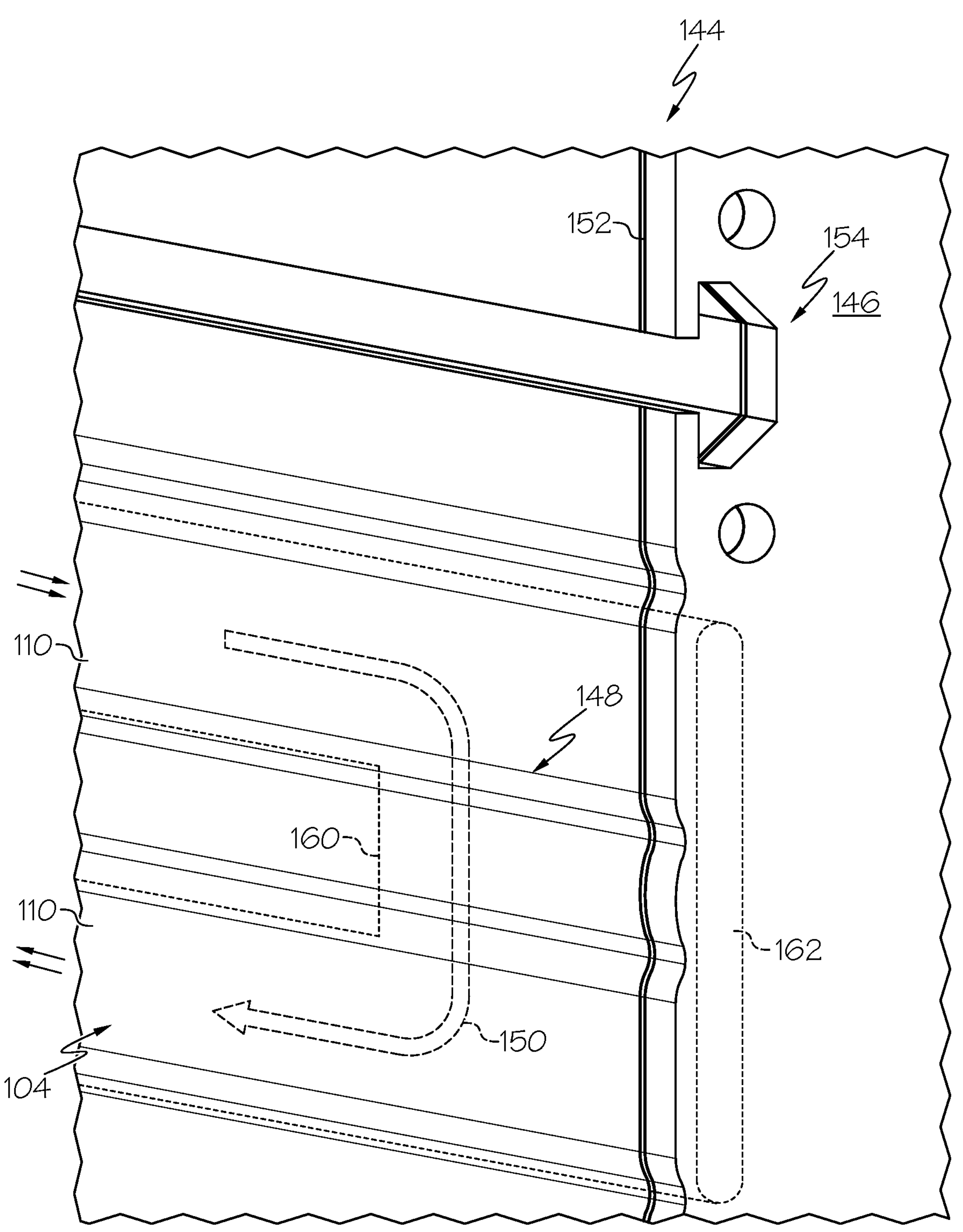
FIG. 4 shows a portion of the battery module of FIG. 1 having an interface between an extruded wall and an end plate.

Referring to FIG. 4, additional features of the battery module housing 100 of FIG. 1 are shown. FIG. 4 shows an interface 144 between an extruded sidewall 104 and an endplate 146 capping the cooling channels 110. The endplate 146 may serve as part of a fluid-routing mechanism for routing fluid in between adjacent coolant channels 110 in the extruded sidewall 104. In some embodiments, adjacent channels 110 may be fluidly coupled via a fluid-routing mechanism including one or more couplings (e.g., an external coupling such as a pipe fitting), which may extend into the coolant channel or surround an exit of the coolant channel and a tube between the couplings. In some embodiments, an external coupling may include, for example, an end cap integrated with a J2044 or other quick connect type of connector to allow for connection from one coolant channel to another or otherwise back to the battery module housing. In some embodiments, an external coupling may link coolant channels in the various sidewalls, for example, an external coupling may provide a medium for coolant flow from a channel in a horizontal wall to a channel in a vertical wall and vice versa. In some aspects, the fluid-routing mechanism could be formed by an internal coupling such as, for example, by drilling holes in walls in between adjacent coolant channels 110 and fitting one or more internal pipes or other mechanisms in the drilled holes.

FIG. 4 further shows a coolant channel connection 148 milled in between adjacent coolant channels 110 in the extruded sidewall 104. The coolant channel connection 148 may be created by milling into the sidewall 104 between adjacent coolant channels 110 to a milled end 160 such that the coolant channel connection 148 may define a pair of turns that allows fluid to flow in between adjacent coolant channels 110 following a flow path 150. The endplate 146 may prevent fluid from leaving the coolant channels 110 at an end 162 of the channel by capping the milled channel connection 148. A gasket 152 may be installed between the endplate 146 and the extruded sidewall 104 at the interface 144. The endplate 146 and/or the extruded sidewall 104 may include one or more mating features 154 for mating portions of the battery module housing 100 to another battery module housing or other external component.

In some aspects, the coolant channel connection 148 may be formed by forming a channel in the endplate 146. In such embodiments, a channel could be formed in the endplate 146 by, for example, milling the endplate 146 and/or by forming an extruded endplate with channels in the endplate. In such embodiments, the endplate 146 may have an increased thickness to account for the additional material required to form the coolant channel connection. Additionally, in such embodiments, the extruded sidewall 104 may or may not be milled to form the coolant channel connection 148 together with the endplate 146.

Figure 5:
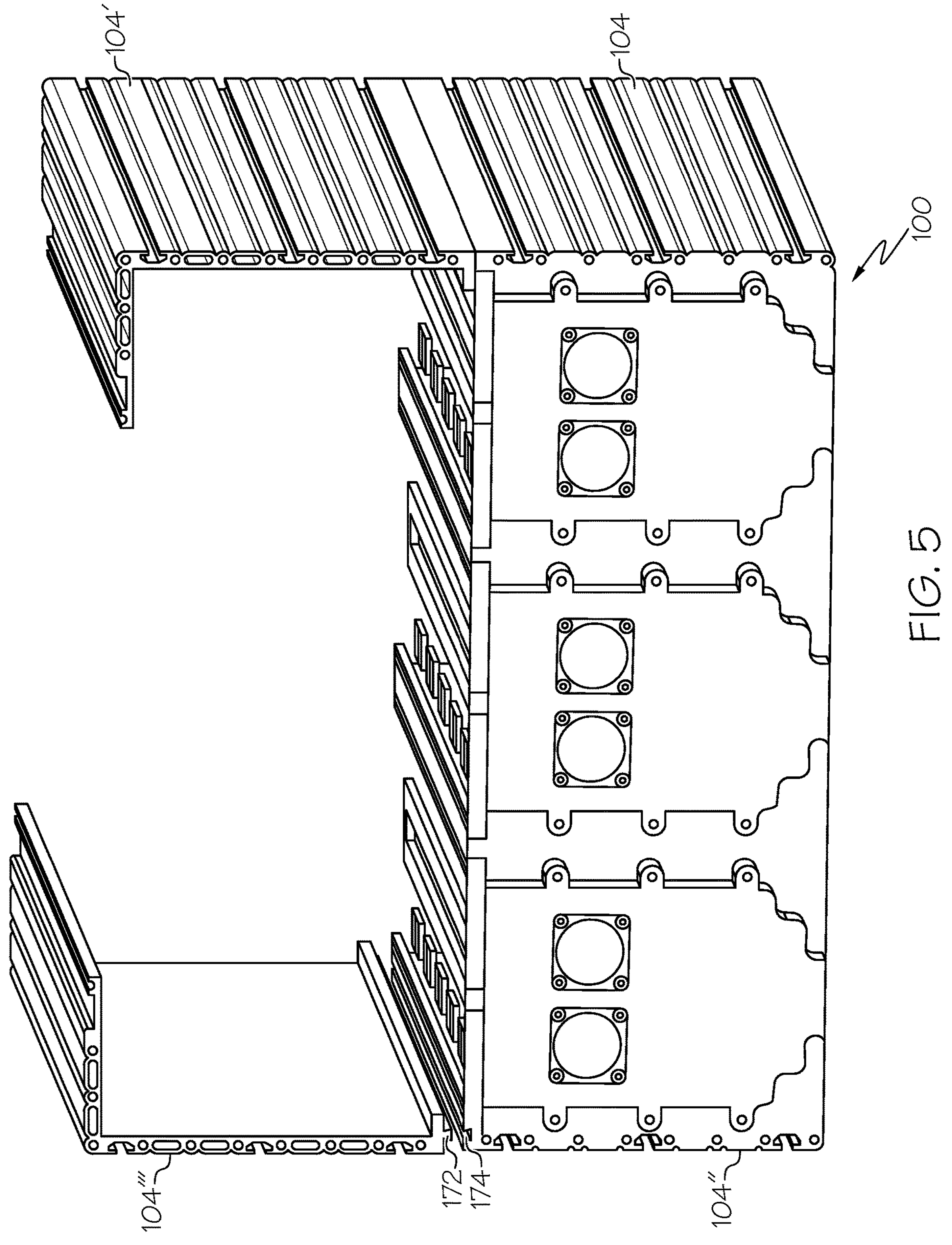
FIG. 5 shows a stacking of multiple battery modules such as the battery module of FIG. 1.

FIG. 5 shows an exemplary means for coupling one battery module housing 100 to another. In the particular embodiment depicted, an extruded sidewall 104' is stacked upside down and atop the extruded sidewall 104. The remaining portions of the battery module housing could be adjoined to the extruded sidewall 104' as described herein to form a second battery module housing above the battery module housing 100. In some embodiments, one or more gaskets or other sealing elements may be placed between the extruded sidewall 104 and the extruded sidewall 104' to seal the interior of a multi-cell battery module formed by the two extruded sidewalls 104, 104'. In some embodiments, the battery module housings 100 may be coupled together using one or more mating features 170. The mating features 170 may include features such as a tongue-and-groove coupling that includes a tongue 172 and a groove 174 along a length of an interface between extruded sidewalls 104" and 104'". In some embodiments one or more of the externally-facing walls of the battery module housing 100 includes mating features 170. The mating features are not limited to just the tongue-and-groove arrangement but can include any suitable mating features for joining multiple battery module housings together.

INDUSTRIAL APPLICABILITY

The disclosed aspects of the battery module housing of the present disclosure may be used to cool multiple cells of a battery. As shown in FIG. 1 multiple cells 10 may be loaded into the cell cavities 102 and electrically coupled to one another (e.g., by electrically coupling the positive and negative terminals of cells). The cells 10 in each of the cell cavities 102 may form a submodule and the submodules may be electrically connected in series or in parallel to form a battery module. The battery modules may then be electrically connected in series or in parallel to form a battery system. The battery system may be used to, for example, power an electric vehicle (e.g., an electrically-powered machine for earthmoving, mining, paving, forestry, hauling, etc.) or electrical equipment (e.g., power generation and/or storage).

While the battery system is in operation, each of the battery modules may generate heat. Accordingly, this heat should be dissipated from the pack for optimal operation of the battery system. Fluid may be supplied to the coolant fluid channels 110 via a coolant fluid system (not shown) to facilitate cooling. With brief reference to FIG. 4, the coolant fluid system may supply fluid to a fluid supply channel 50 and receive fluid from a fluid return channel 52. The coolant supply system may include, for example, a coolant fluid reserve (e.g., a sump, a tank, etc.), a coolant pump, a heat exchanger, and one or more pipes or other conduits for supplying coolant fluid to the coolant channels 110 of the battery module housing 100 and returning coolant fluid from the battery module housing 100 to the coolant supply system.

In some embodiments, all of the coolant channels 110 in a particular wall 104, 106, or 108 of the battery module housing 100 may be connected in series or in parallel with one another. Each coolant channel 110 may be connected to the next (e.g., downstream) coolant channel 110 using the milling process described herein. In other embodiments, not all the coolant channels may be connected together such that only selected coolant channels of the plurality of coolant channels are connected.

Additionally, the T-shaped extruded parts 132 and the L-shaped extruded parts 118 can be combined as shown in FIG. 1 in any number to form multiple adjacent cell cavities 102 to form the battery module housing 100 (e.g., there can be three, four, five, etc. cell cavities 102 formed next to one another). In some embodiments, an L-shaped extruded part with a bottom wall connection interface 120 may be combined with an L-shaped extruded part with a second bottom wall connection interface 134 to form a battery module housing 100 with a single cell cavity 102.

Additionally, in some embodiments, to support physically mating one or more battery module housings together, the various battery module housings may be secured with mating features. The mating features may include, for example, a tongue-and-groove type mating feature or a double-male sided connector which may be configured to fit within two female connectors of adjacent battery module housing elements.

It should now be understood that sidewalls of a battery system can have one or more fluid-routing systems configured for routing fluid in between channels that may be formed in the walls. Providing internal cooling for battery housings can provide cooling above industry standard approaches, which may utilize bottom cell cooling, which may have limited effective ness when utilizing taller larger cells. The internally-routed channels of the present application may provide adequate cooling while also providing sufficient sealing of battery housing from external elements (e.g., dust, dirt, etc.) and adequate structural strength.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A battery module housing comprising:

a bottom wall;

a first L-shaped extruded part including a first horizontal portion having a first connection interface;

a T-shaped extruded part having a first horizontal portion and a second horizontal portion, the first horizontal portion having a second connection interface and the second horizontal portion having a third connection interface;

a second L-shaped extruded part including a second horizontal portion having a fourth connection interface; and a pair of sidewalls, wherein the first connection interface of the first L-shaped extruded part is configured to form a first junction with the second connection interface of the first horizontal portion of the T-shaped extruded part, and the third connection interface of the second horizontal portion of the T-shaped extruded part is configured to form a second junction with the fourth connection interface of the second L-shaped extruded part, and at least one of the bottom wall, and the pair of sidewalls is a wall comprising a plurality of fluid channels extending an entire length of the wall, each of the plurality of fluid channels ending in a fluid-routing mechanism formed by an endplate that fluidly couples a first channel of the plurality of fluid channels to a second channel of the plurality of fluid channels via a coolant channel connection formed at a first end of the wall.

2. The battery module housing of claim 1, wherein a third channel of the plurality of fluid channels is fluidly coupled to the second channel via a second coolant channel connection.

3. The battery module housing of claim 2, wherein the coolant channel connection and the second coolant channel connection are formed by milling from an end of a sidewall and capping the end of the sidewall with an endplate.

4. The battery module housing of claim 1, wherein each of the pair of sidewalls include mating features for mating the battery housing to another battery module housing.

5. The battery module housing of claim 4, wherein the mating features include one or more tongue and groove connections.

6. The battery module housing of claim 1, wherein the bottom wall and the pair of sidewalls are extruded walls, extruded through a die forming multiple internal cooling channels in the bottom wall and the pair of sidewalls.

7. The battery module of claim 1, wherein the first junction includes a sealing element, and wherein the sealing element forms an air tight seal.

8. The battery module housing of claim 1, wherein the extruded parts comprise aluminum, steel, or iron.

9. The battery module housing of claim 1, wherein the first and second L-shaped extruded parts include one or more mating features.

10. The battery module housing of claim 9, wherein the one or more mating features include a tongue and groove connector configured to couple the battery module housing with another battery module housing.

11. The battery module housing of claim 1, comprising three battery housing cell cavities.

12. A battery module housing for housing battery cell cavities comprising:

a first L-shaped extruded part comprising a vertical portion and a horizontal portion, the horizontal portion of the first L-shaped extruded part having a downward-facing connection interface;

a T-shaped extruded part comprising a vertical portion, a first horizontal portion, and a second horizontal portion, the first horizontal portion of the T-shaped extruded part having an upward-facing connection interface, and the second horizontal portion of the T-shaped extruded part having a downward-facing connection interface; and a second L-shaped extruded part comprising a vertical portion and a horizontal portion, the horizontal portion of the second L-shaped extruded part having an upward-facing connection interface, wherein the vertical portions of the extruded parts form sidewalls of the battery cell cavities, the horizontal portions of the extruded parts form bottom walls of the battery cell cavities, the vertical portions of the first L-shaped extruded part, the second L-shaped extruded part, and the T-shaped extruded part include a first fluid channel fluidly coupled to a second fluid channel by a fluid-routing mechanism, and the downward-facing connection interface of the first L-shaped extruded part is configured to form a first junction with the upward-facing connection interface of the first horizontal portion of the T-shaped extruded part, and the downward-facing connection interface of the second horizontal portion of the T-shaped extruded part is configured to form a second junction with the upward-facing connection interface of the second L-shaped extruded part.

13. The battery module housing of claim 12, wherein the fluid-routing mechanism is an endplate that fluidly couples the first channel with the second channel via a coolant channel connection formed by milling from a first end of the extruded wall.

14. The battery module housing of claim 12, wherein the extruded parts comprise aluminum, steel, or iron.

15. The battery module housing of claim 12, wherein the first and second L-shaped extruded parts include one or more mating features.

16. The battery module housing of claim 15, wherein the one or more mating features include a tongue and groove connector configured to couple the battery module housing with another battery module housing.

17. The battery module housing of claim 12, comprising three battery housing cell cavities.

18. A battery housing cell cavity comprising:

a bottom wall;

a first L-shaped extruded part including a first horizontal portion having a first connection interface;

a T-shaped extruded part having a first horizontal portion and a second horizontal portion, the first horizontal portion having a second connection interface and the second horizontal portion having a third connection interface; and a second L-shaped extruded part including a second horizontal portion having a fourth connection interface, wherein the first connection interface of the first L-shaped extruded part is configured to form a first junction with the second connection interface of the first horizontal portion of the T-shaped extruded part, and the third connection interface of the second horizontal portion of the T-shaped extruded part is configured to form a second junction with the fourth connection interface of the second L-shaped extruded part, and wherein one or more of a vertical portion of the first L-shaped extruded part, a vertical portion of the T-shaped extruded part, or the bottom wall comprises a plurality of fluid channels therein.

19. The battery housing cell cavity of claim 18, wherein at least two of the plurality of fluid channels are fluidly coupled to one another by a milled fluid channel wall.

20. The battery housing cell cavity of claim 18, further comprising a fluid-routing mechanism that fluidly connects two or more of the fluid channels via a coolant channel connection.

* * * * *